US009019949B2

United States Patent
Lin et al.

(10) Patent No.: US 9,019,949 B2
(45) Date of Patent: Apr. 28, 2015

(54) ADAPTER, BASE BAND PROCESSING UNIT AND BASE STATION SYSTEM

(71) Applicant: International Business Machines Corporation, Armonk, NY (US)

(72) Inventors: Yonghua Lin, Beijing (CN); Rong Yan, Beijing (CN); Hai Zhan, Beijing (CN); Chao Zhu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 121 days.

(21) Appl. No.: 13/794,893

(22) Filed: Mar. 12, 2013

(65) Prior Publication Data

US 2013/0336237 A1    Dec. 19, 2013

(30) Foreign Application Priority Data

Mar. 30, 2012    (CN) .......................... 2012 1 0091148

(51) Int. Cl.
*H04J 3/06* (2006.01)
*H04W 88/10* (2009.01)
*H04W 56/00* (2009.01)

(52) U.S. Cl.
CPC .......... *H04W 88/10* (2013.01); *H04W 56/0005* (2013.01)

(58) Field of Classification Search
None
See application file for complete search history.

(56) References Cited

U.S. PATENT DOCUMENTS

| | | | |
|---|---|---|---|
| 6,032,033 A * | 2/2000 | Morris et al. ............... | 455/277.2 |
| 6,542,754 B1 | 4/2003 | Sayers et al. | |
| 7,020,115 B2 * | 3/2006 | Chillariga et al. ............ | 370/337 |
| 7,751,372 B2 * | 7/2010 | Monsen ........................ | 370/335 |
| 7,764,593 B2 | 7/2010 | Kim et al. | |
| 7,796,554 B2 * | 9/2010 | Liu et al. ........................ | 370/331 |
| 8,031,745 B2 | 10/2011 | Onggosanusi et al. | |
| 8,326,309 B2 * | 12/2012 | Mody et al. ................ | 455/452.1 |
| 8,724,740 B2 * | 5/2014 | Kim .............................. | 375/316 |
| 2007/0243832 A1 | 10/2007 | Park et al. | |
| 2010/0234063 A1 | 9/2010 | Mueck et al. | |
| 2011/0116386 A1 * | 5/2011 | Blanchard et al. ............ | 370/242 |

FOREIGN PATENT DOCUMENTS

EP    2086271 A2    8/2009

OTHER PUBLICATIONS

Wen Xu et al., "Efficient base band implementation on an SDR Platform", ITS Telecommunications (ITST), 2011 11th Intl Conf., Aug. 23-25, 2011, p. 794-9.
"Technical and operational characteristics and applications of broadband wireless access in the fixed service", Report F.2086,Intl Telecomm Union (ITU-R), 2011,Geneva.

* cited by examiner

Primary Examiner — Michael J Moore, Jr.
(74) Attorney, Agent, or Firm — Jeff Tang

(57) ABSTRACT

An adapter, base band processing unit and a base station system. The adapter includes a frame obtaining logic unit configured to obtain an uplink data frame based on a received radio frame. A frame synchronizing logic unit configured to manage a frame tag of the uplink data frame. A time feedback logic unit configured to feedback to the base band processing unit an arrival time of a downlink data frame that is received from the base band processing unit. The base band processing unit includes a time synchronizing module configured to determine generation time of a current downlink data frame based on at least an arrival time of a previous downlink data frame that was a previous feed back from the adapter. A frame synchronizing module configured to manage a frame tag of the generated current downlink data frame.

18 Claims, 9 Drawing Sheets

ADAPTER, BASE BAND PROCESSING UNIT AND BASE STATION SYSTEM

CROSS-REFERENCE TO RELATED APPLICATION

This application claims priority under 35 U.S.C. §119 from Chinese Patent Application No. 201210091148.1 filed Mar. 30, 2012, the entire contents of which are incorporated herein by reference.

BACKGROUND OF THE INVENTION

1. Field of the Invention

The present invention is related to communication base station, and more particularly, to a base station system over a general IT platform, an adapter and base band processing unit.

2. Description of the Related Art

In recent years, wireless communication technology has developed rapidly. To achieve efficient processing of base station signal, Software defined radio (SDR) base station is proposed to perform signal processing.

Figure 1A:
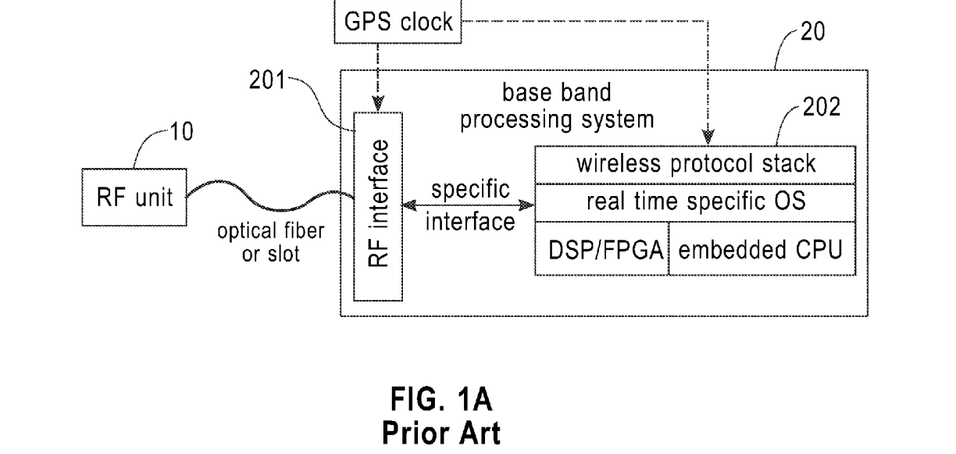
FIG. 1A shows a structure diagram of a base station system over a traditional SDR platform.

FIG. 1A shows a structure diagram of a base station system over traditional SDR platform. As shown in FIG. 1A, the base station system includes a Radio Frequency (RF) unit 10 and a base band processing system 20. The RF unit 10 is used to transmit and receive RF signals to communicate with mobile terminals. Specifically, the RF unit 10 receives uplink data signal from a mobile terminal and transmits it to the base band processing system 20. It obtains processed downlink data from the base band processing system 20 and transmits it to the mobile terminal. The base band processing system 20 includes a RF interface 201 and a base band processing unit 202. The RF interface 201 is coupled to the RF unit 20 via optical fiber or hardware slot at one side, and is coupled to the base band processing unit 202 via an appropriate specific interface at the other side, so as to pass and transform data between the RF unit 10 and the base band processing unit 202. The base band processing unit 202 performs all the signal processing by using a specific hardware board. Specifically, the base band processing unit 202 includes a variety of specific hardware at a physical hardware layer, such as DSP, FPGA, embedded CPU etc. Simultaneous to the specific hardware, specific real time operating system is installed. Further, wireless protocol stacks in form of software are installed on the operating system and are used to perform processing of base band signals.

Since the SDR system shown in FIG. 1A performs signal processing using a specific hardware platform, for different communication standards and operating modes, different types and numbers of specific chips need to be used in most cases. Existing hardware platform needs to be altered when wireless standard is upgraded or changed. Thus, such systems have low flexibility and expansibility, but very high cost for developing, operating and maintaining hardware and software.

Figure 1B:
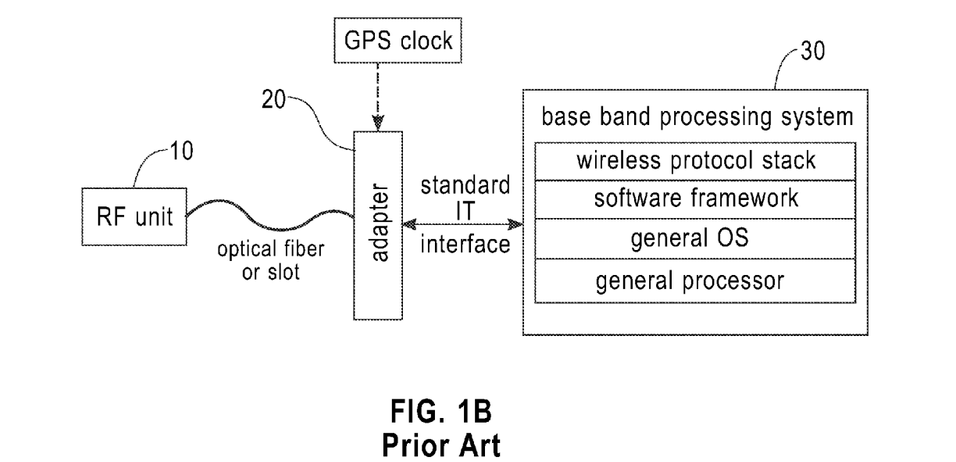
FIG. 1B shows a structure diagram of a base station system over a general IT platform.

These problems existed in a traditional SDR base station. There is a proposed SDR system over a general IT platform. FIG. 1B shows a structure diagram of a base station system over a general IT platform. As shown in FIG. 1B, the base station system includes a Radio Frequency (RF) unit 10, an adapter 20 and a base band processing unit 30. The RF unit 10 of FIG. 1B is similar to that of FIG. 1A. The adapter 20 is used to perform data transmission and transformation between the RF unit 10 and the base band processing unit 30. In contrast to the RF interface of FIG. 1A, the adapter 20 is separated from the base band processing system as a standalone (hardware) component. The base band processing unit 30 performs signal processing via a general IT platform. Specifically, the base band processing unit 30 includes on physical hardware layer a general processor upon which a general operating system can be installed. Desired software framework and wireless protocol stacks can in turn be installed on the general operating system. Since the base band processing unit 30 is represented as a general IT computing platform, it can provide to outside general standard IT interfaces such as network interface, PCIe interface etc. Accordingly, the adapter 20 can be coupled to the base band processing unit 30 via these standard interfaces.

In the base station system shown in FIG. 1B, the base band processing unit 30 is implemented over a general IT platform. With the development of multi-core technology, the general IT platform is more likely to be implemented with multi-core chips, which makes computing capability of the IT platform grow rapidly. Since a general IT platform is utilized, it is possible to make a base station to be applicable to different wireless communication standards and operating modes via software modification without having to change physical components. Therefore, flexibility and expansibility of the base station is improved and development cost and operation cost is reduced. The base station system as shown in FIG. 1B still faces some technical challenges.

Those skilled in the art will appreciate that, either FDD (Frequency Division Duplex) or TDD (Time Division Duplex) mode can be utilized to communicate between a base station and a mobile terminal. Under FDD mode, the base station and the mobile terminal receive and transmit data on two separated symmetrical frequency channels, and receiving and transmitting channels are separated by different frequency bands. Under TDD mode, uplink and downlink communication between the base station and the mobile terminal use different time slots of a same frequency channel (that is, carrier wave), and receiving and transmitting channels are separated by time. Thus, the base station transmits signals to the mobile terminal at a certain time period, and the mobile terminal transmits signals to the base station at another time period. When the SDR system as shown in FIG. 1B is used in TDD mode, since receiving and transmitting channels are separated by time, time in the base station system is a very critical factor. Time synchronization in a traditional SDR system over specific hardware platform is not a problem, because in the system shown in FIG. 1A, for example, all the signals are processed by specific hardware and processing latency is fixed. All of the timing information in a base band processing system is provided by a GPS module. In this case, it is very easy to achieve time synchronization between a base band processing unit and a RF unit. In the SDR base station over a general IT platform shown in FIG. 1B, for example, only the adapter 20 is directly coupled to the GPS module that provides reference time, and the base band processing unit 30 can not directly obtain that reference time. The base band processing unit 30 over a general IT platform does not support the real time operation realized by specific hardware, instead, large buffers commonly used on general IT platform and task scheduling in general operating system etc often lead to unpredictable large round-trip delay. In addition, jitters will often occur to a system running on a general IT platform, leading to instability in time delay of signal processing. The factors described above make the base band processing unit 30 based on a general IT platform difficult to provide accurate time and can not reach time synchronization with the adapter 20.

To solve this problem, some solutions are set forth in prior art. In one solution, time to transmit downlink data is calculated by using time information of uplink data. However, in this solution, jitters of uplink data will accumulate to downlink, leading to large round-trip delay. Therefore, to make a SDR system over a general IT platform achieve better time synchronization used in TDD mode is a problem yet to be solved.

By modifying the installed software, the above SDR system over a general IT platform can be applicable to both TDD and FDD mode respectively. However, if the same SDR system can be made to adapt to the two operating modes simultaneously, that is, making an existing SDR system to be applicable to a TDD and FDD dual-mode radio access network, then operation cost can be further reduced. Thus, it is desirable to provide a base station system that is applicable to dual modes.

SUMMARY OF THE INVENTION

The present invention is proposed in view of the above proposed problems and the purpose of which is to solve at least one aspect of the above problems.

An aspect of the present invention provides an adapter for connecting a Radio Frequency (RF) unit and a base band processing unit in a base station system. The adapter includes a frame obtaining logic unit configured to obtain an uplink data frame based on a received radio frame. A frame synchronizing logic unit configured to manage a frame tag of the uplink data frame. A time feedback logic unit configured to feed back to the base band processing unit an arrival time of a downlink data frame that is received from the base band processing unit.

Another aspect of the present invention provides a base band processing unit over a general IT platform that is coupled to an adapter. The base band processing unit includes a time synchronizing module configured to determine generation time of a current downlink data frame based on at least an arrival time of a previous downlink data frame that was a previous feed back from the adapter. A frame synchronizing module configured to manage a frame tag of the generated current downlink data frame.

Another aspect of the present invention provides base station system which includes a Radio Frequency (RF) unit. An adapter is communicatively coupled to the RF unit. The adapter includes a frame obtaining logic unit configured to obtain an uplink data frame based on a received radio frame; a frame synchronizing logic unit configured to manage a frame tag of the uplink data frame; a time feedback logic unit configured to feed back to the base band processing unit an arrival time of a downlink data frame that is received from the base band processing unit. The base station includes the base band processing unit communicatively coupled to the adapter. The base band processing unit includes a frame obtaining logic unit configured to obtain an uplink data frame based on a received radio frame; and frame synchronizing logic unit configured to manage a frame tag of the uplink data frame. A time feedback logic unit is configured to feed back to the base band processing unit an arrival time of a downlink data frame that is received from the base band processing unit.

Another aspect of the present invention provides a method for performing time synchronization for TDD communication mode between an adapter and a base band processing unit in a base station system. The method includes generating, by the base band processing unit, a downlink data frame and transmitting the downlink data frame to the adapter. Receiving, by the adapter, the downlink data frame and feeding back an arrival time of the downlink data frame to the base band processing unit. Determining, by the base band processing unit, a generation time of a next downlink data frame based on at least the feed back arrival time of the downlink data frame.

BRIEF DESCRIPTION THE DRAWINGS

Through the detailed description of some embodiments of the present invention in the accompanying drawings, the above and other objects, features and advantages of the present invention will become more apparent. The same reference generally refers to the same components in the embodiments of the present invention.

DETAILED DESCRIPTION OF THE PREFERRED EMBODIMENTS

Some preferable embodiments will be described in detail with reference to the accompanying drawings, in which the preferable embodiments of the present invention have been illustrated. However, the present invention can be implemented in various manners, and should not be construed to be limited to the embodiments disclosed herein. The embodiments are provided for the thorough and complete understanding of the present invention, and conveying the scope of the present invention to those skilled in the art.

Figure 2:
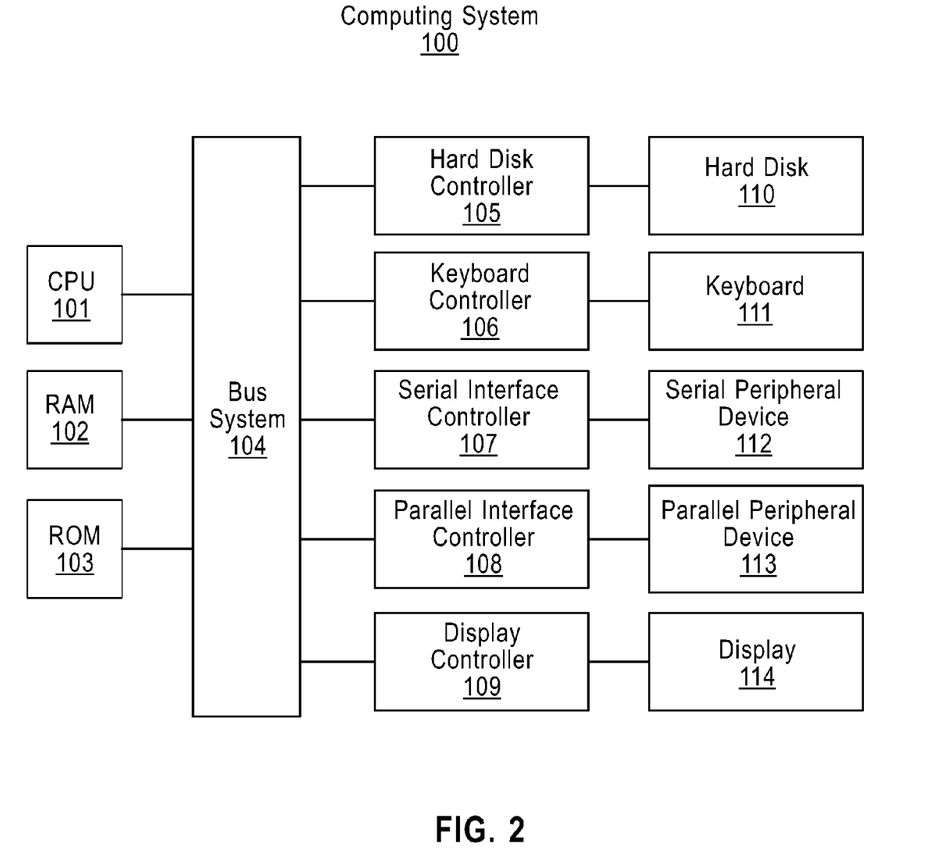
FIG. 2 shows an exemplary computer system 100 which is applicable to implement the embodiments of the present invention.

FIG. 2 displays an exemplary computer system 100 which is applicable to implement the embodiments of the present invention. As shown in FIG. 1, the computer system 100 may include: CPU (Central Process Unit) 101, RAM (Random Access Memory) 102, ROM (Read Only Memory) 103, System Bus 104, Hard Drive Controller 105, Keyboard Controller 106, Serial Interface Controller 107, Parallel Interface Controller 108, Display Controller 109, Hard Drive 110, Keyboard 111, Serial Peripheral Equipment 112, Parallel Peripheral Equipment 113 and Display 114. Among above devices, CPU 101, RAM 102, ROM 103, Hard Drive Controller 105, Keyboard Controller 106, Serial Interface Controller 107, Parallel Interface Controller 108 and Display Controller 109 are coupled to the System Bus 104. Hard Drive 110 is coupled to Hard Drive Controller 105. Keyboard 111 is coupled to Keyboard Controller 106. Serial Peripheral Equipment 112 is coupled to Serial Interface Controller 107. Parallel Peripheral Equipment 113 is coupled to Parallel Interface Controller 108. And, Display 114 is coupled to Display Controller 109. It should be understood that the structure as shown in FIG. 1 is only for an exemplary purpose rather than any limitation to the present invention. In some cases, some devices can be added to or removed from the computer system 100 based on specific situations.

As will be appreciated by one skilled in the art, aspects of the present invention can be embodied as a system, method or computer program product. Accordingly, aspects of the present invention can take the form of an entirely hardware embodiment, an entirely software embodiment (including firmware, resident software, micro-code, etc.) or an embodiment combining software and hardware aspects that can generally be referred to as a "circuit," "module" or "system." Furthermore, aspects of the present invention can take the form of a computer program product embodied in one or more computer readable medium(s) having computer readable program code embodied.

Any combination of one or more computer readable medium(s) may be utilized. The computer readable medium can be a computer readable signal medium or a computer readable storage medium. A computer readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium can be any tangible medium that can contain, or store a program for use by or in connection with an instruction execution system, apparatus, or device.

A computer readable signal medium can include a propagated data signal with computer readable program code embodied, for example, in baseband or as part of a carrier wave. Such a propagated signal can take any of a variety of forms, including, but not limited to, electro-magnetic, optical, or any suitable combination. A computer readable signal medium can be any computer readable medium that is not a computer readable storage medium and that can communicate, propagate, or transport a program for use by or in connection with an instruction execution system, apparatus, or device.

Program code embodied on a computer readable medium can be transmitted using any appropriate medium, including but not limited to wireless, wireline, optical fiber cable, RF, etc., or any suitable combination of the foregoing.

Computer program code for carrying out operations for aspects of the present invention can be written in any combination of one or more programming languages, including an object oriented programming language such as Java, Smalltalk, C++ or the like and conventional procedural programming languages, such as the "C" programming language or similar programming languages. The program code can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions can also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 3:
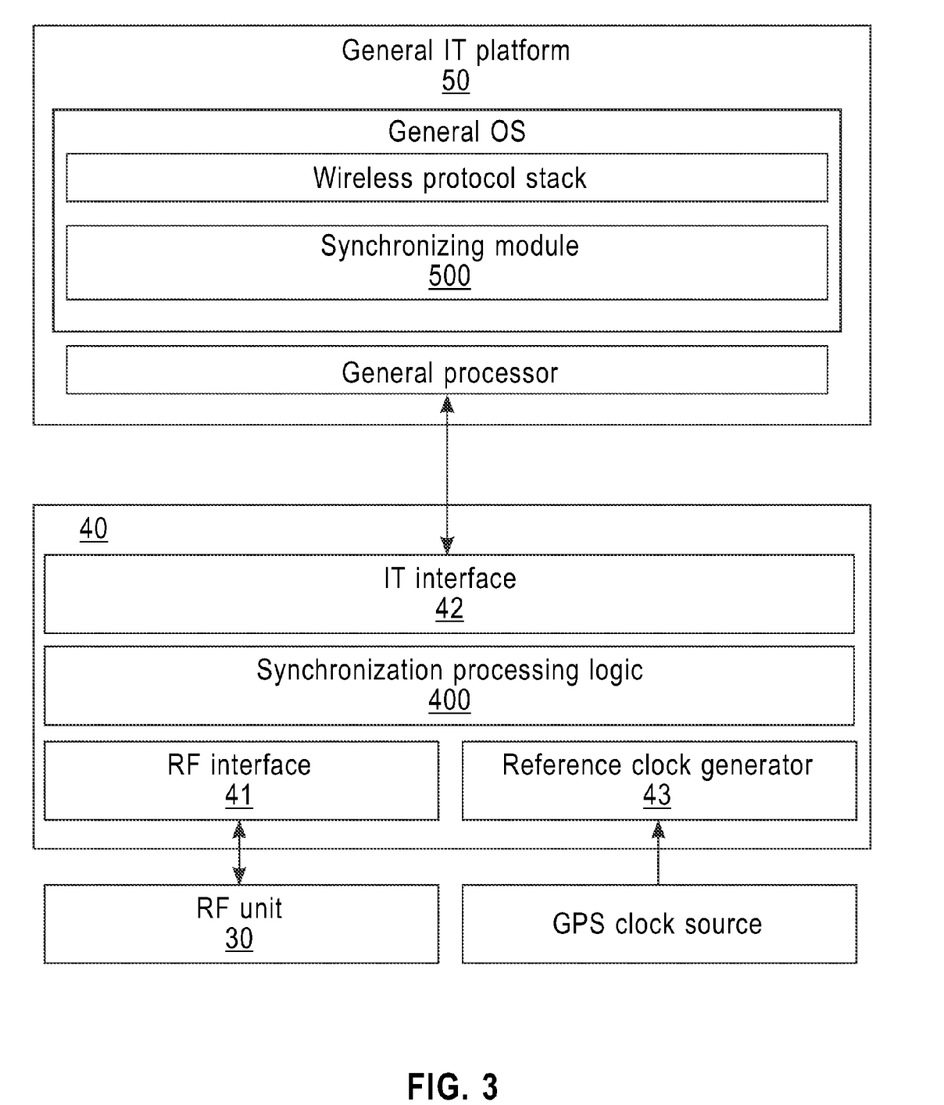
FIG. 3 shows a structure diagram of a SDR base station system according to a further embodiment of the present invention.

FIG. 3 shows a structure diagram of a SDR base station system according to an embodiment of the present invention. As shown in FIG. 3, the base station system includes a RF unit 30, an adapter 40 and a base band processing unit 50. The RF unit 30 is configured to transmit/receive data to/from mobile terminals. The RF unit 30 is typically coupled to the adapter 40 via optical fiber, provides to the adapter 40 uplink data from mobile terminals, and obtains from the adapter 40 processed downlink data.

The adapter 40 is connected between the RF unit 30 and the base band processing unit 40 and performs transmission and transformation on communication data. Specifically, the adapter 40 includes a RF interface 41, an IT interface 42, a reference clock generator 43 and a synchronization processing logic 400. The RF interface 41 is directly coupled to the RF unit 30 and exchanges data. The RF interface 41 can be a CPRI interface or an IR interface. At the other side, the IT interface 42 is directly coupled to the base band processing unit 50 and exchanges data therewith. The IT interface 42 can be various IT standard interfaces such as PCI-E, Ethernet interface, USB interface etc. The reference clock generator 43 is coupled to an external clock source and generates reference time of the base station system based on time provided by the clock source. The clock source can be any component that is capable of providing stable reference clock. Typically, the clock source is a GPS clock source. The described RF interface 41, IT interface 42 and reference clock generator 43 are also provided in an existing adapter, and the detailed description of which will be omitted. To perform transmission and transformation of communication data under TDD mode, the adapter 40 further includes a synchronization processing logic 400. The synchronization processing logic 400 facilitates frame synchronization processing of an uplink data frame and a downlink data frame and time synchronization processing between the adapter 40 and the base band processing unit 50.

The base band processing unit 50 is based on a general IT platform and thus includes general processor(s) at physical layer. To facilitate base band processing, the base band processing unit 50 includes a synchronizing module 500 under wireless stack in the operating system. The synchronizing module 500 operates in conjunction with the synchronization processing logic 400 in the adapter 40, to achieve frame synchronization of uplink data frame and downlink data frame in TDD mode, and time synchronization between the adapter 40 and the base band processing unit 50. The structure and implementation of the synchronization processing logic 400 and the synchronizing module 500 will be described below.

Figure 4:
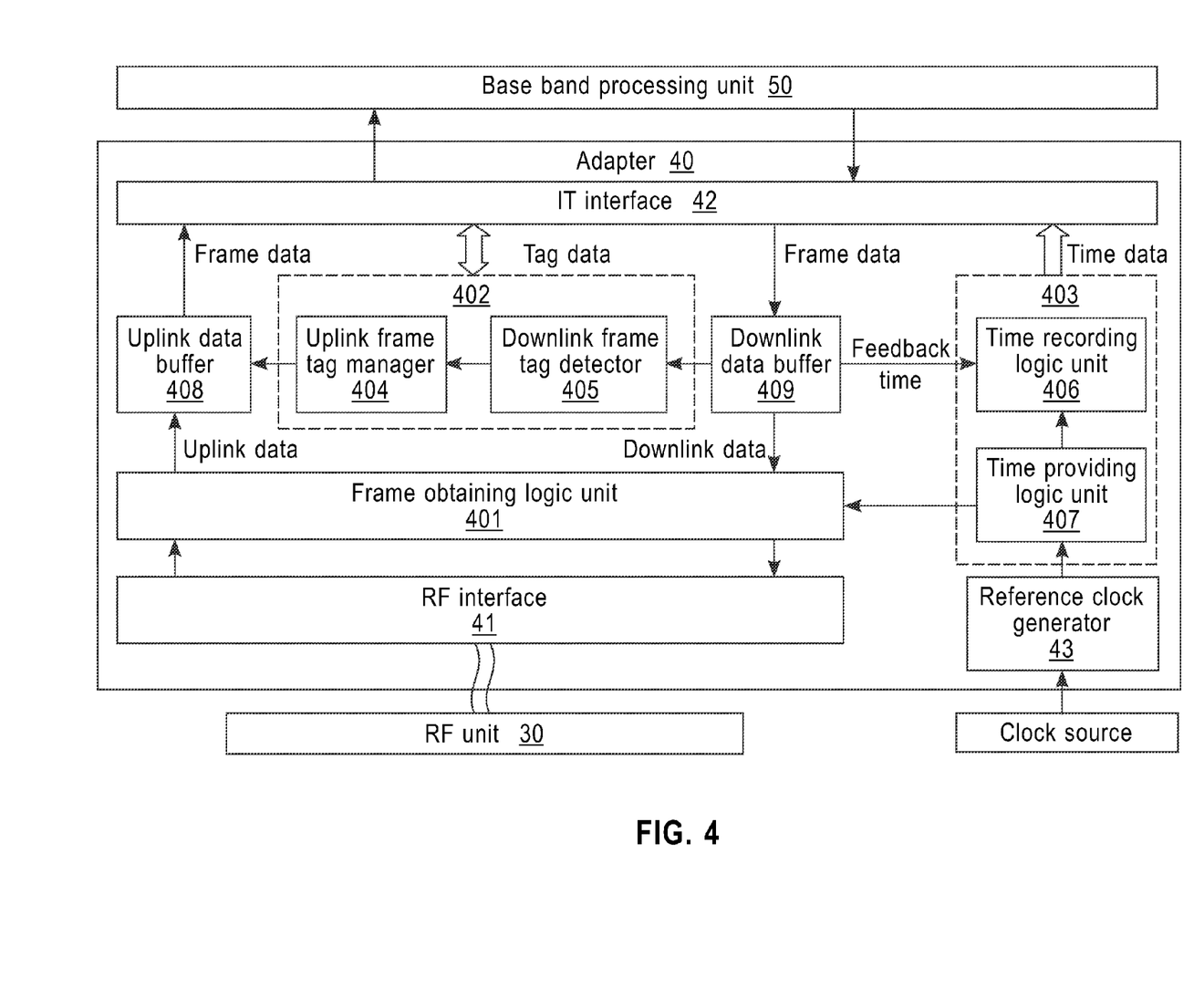
FIG. 4 shows a structure diagram of an adapter according to a further embodiment of the present invention.

FIG. 4 shows a structure diagram of an adapter according to an embodiment of the present invention. In addition to the RF interface 41, IT interface 42, reference clock generator 43 that are the same as FIG. 3, the adapter in FIG. 4 shows structure of the synchronization processing logic 400. The synchronization processing logic 400 includes a frame obtaining logic unit 401, a frame synchronizing logic unit 402 and a time feedback logic unit 403. The frame obtaining logic unit 401 is configured to obtain an uplink data frame based on a received radio frame. The frame synchronizing logic unit 402 is configured to manage a frame tag of the uplink data frame. The time feedback logic unit 403 is configured to feedback arrival time of a downlink data frame to the base band processing unit 50.

The frame obtaining logic unit 401 exchanges radio frame data with the RF interface 41, and performs de-framing and framing on the data. The frame obtaining logic unit 401 obtains an uplink data frame by performing de-framing on a received radio frame. The frame obtaining logic unit 401 also obtains a downlink data frame from the base band processing unit, and forms a radio frame to be transmitted based on an uplink data frame and a downlink data frame. As known to a person skilled in the art, under TDD mode, uplink data and downlink data are transmitted in different time slots. Accordingly, a radio frame in TDD mode includes both uplink data and downlink data. According to specification of a LTE (Long Term Evolution) system, length of each radio frame in TDD mode is 10 ms, and each radio frame further includes two half frames whose length are 5 ms. Each half frame includes four data sub-frames and one special sub-frame. Among these data sub-frames, a portion is for uplink data transmission, and the other portion is for downlink data transmission. The proportion of uplink/downlink data sub-frames can be changed and configured according to traffic of uplink/downlink. Based on such a TDD radio frame, the frame obtaining logic unit 401 performs time slot switching based on predetermined radio frame structure, so as to obtain data in sub-frames of uplink transmission, which is referred to as uplink data frame. The uplink data frame proceeds to be sent from the frame obtaining logic unit 401 towards the base band processing unit, and finally enter into the base band processing unit 50 after synchronization processing. The base band processing unit 50 generates a downlink data frame. The downlink data frame reaches the frame obtaining logic unit 401 after synchronization processing. For synchronized uplink data frame and downlink data frame, the frame obtaining logic unit 401 can place those into corresponding time slots (or sub-frames) based on predetermined frame structure to form a radio frame. The frame obtaining logic unit 401 transmits the formed radio frame to the RF interface 41 for further wirelessly transmitting via the RF unit.

The uplink data frame from the frame obtaining logic unit 401 can be temporarily stored in an uplink data buffer 408, and downlink data frame from the upstream base band processing unit can be temporarily stored in a downlink data buffer 409. Generally, certain correspondence can need to be maintained between an uplink data frame and a downlink data frame, for example, a downlink data frame can contain an acknowledge to a certain uplink data frame, and vice versa. Thus, uplink data frames and downlink data frames need to be arranged according to the above certain correspondence, that is, to achieve frame synchronization for an uplink data frame and a downlink data frame. To this end, the frame synchronizing logic unit 402 obtains an uplink data frame from the uplink data buffer 408, obtains a downlink data frame from the downlink data buffer 409, and realizes correspondence between the uplink data frame and the downlink data frame by managing a frame tag of the uplink data frame. The described frame tag is an identification attached to a data frame, which can be represented in form of digit, character, code etc that is capable of marking a particular data frame. The frame synchronizing logic unit 402 includes a downlink frame tag detector 404 and an uplink frame tag manager 405. Usually, a frame tag is added for a downlink data frame by the base band processing unit 50 first. The downlink data frame stored in the downlink data buffer 409 in the adapter 40 already has a frame tag. The downlink frame tag detector 404 can detect the frame tag of received downlink data frame. The uplink frame tag manager 405 is coupled to the downlink frame tag detector 404 and adds a corresponding frame tag to an uplink data frame based on the frame tag of the downlink data frame detected by the downlink frame tag detector 404. In one embodiment, for each downlink data frame, the downlink frame tag detector 404 can detect frame tag. The uplink frame tag manager 405 then adds a corresponding frame tag to an uplink data frame based on the detected frame tag. In another embodiment, frame tag is generated according to predetermined generation rule, such as ascending digits. In one example, when the downlink frame tag detector 404 detects the first frame tag of the first downlink data frame, the uplink frame tag manager 405 adds a corresponding frame tag to an uplink data frame based on that first frame tag. Then for a subsequent uplink data frame, the uplink frame tag manager 405 generates a new frame tag based on the generation rule and adds it to the uplink data frame. In one example, the uplink frame tag manager 405 periodically checks the correspondence between frame tag of the uplink data frame and that of the downlink data frame. This enables certain correspondence to be maintained between uplink data frame and downlink data frame, thereby realizing frame synchronization.

In addition to frame synchronization, for TDD mode, time synchronization between the adapter 40 and the base band processing unit 50 needs to be realized. The time feedback logic unit 403 assists in time synchronization processing by providing time feedback. The time feedback logic unit 403 includes a time providing logic 406 and a time recording logic 407. The time providing logic 406 is coupled to the reference clock generator 43 and provides reference time based on the clock generated by the reference clock generator 43. In one embodiment, the time providing logic 406 can periodically provide reference time to the above frame obtaining logic unit 401, such that the frame obtaining logic unit 401 is capable of performing time slot switching based on reference time. Thus, an uplink data frame can be generated based on the provided reference time. The time providing logic 406 also provides reference time to the time recording logic 407. The time recording logic 407 is coupled to the downlink data buffer 409 and records time that a downlink data frame arrives at the downlink data buffer 409, which can be referred to as downlink data arrival time, based on the reference time. The time recording logic 407 transmits the obtained reference time along with the recorded downlink data arrival time as time data to the based band processing unit 50, to assist the base band processing unit 50 in realizing time synchronization.

The adapter 40 containing the synchronization processing logic 400 has been described in reference to FIG. 4. As described above, the synchronization processing logic 400 of the adapter needs to operate in conjunction with the synchronizing module 500 in the base band processing unit 50, thereby realizing frame synchronization and time synchronization of TDD data. The implementation of the base band processing unit 50 and its synchronizing module 500 will be described below.

Figure 5:
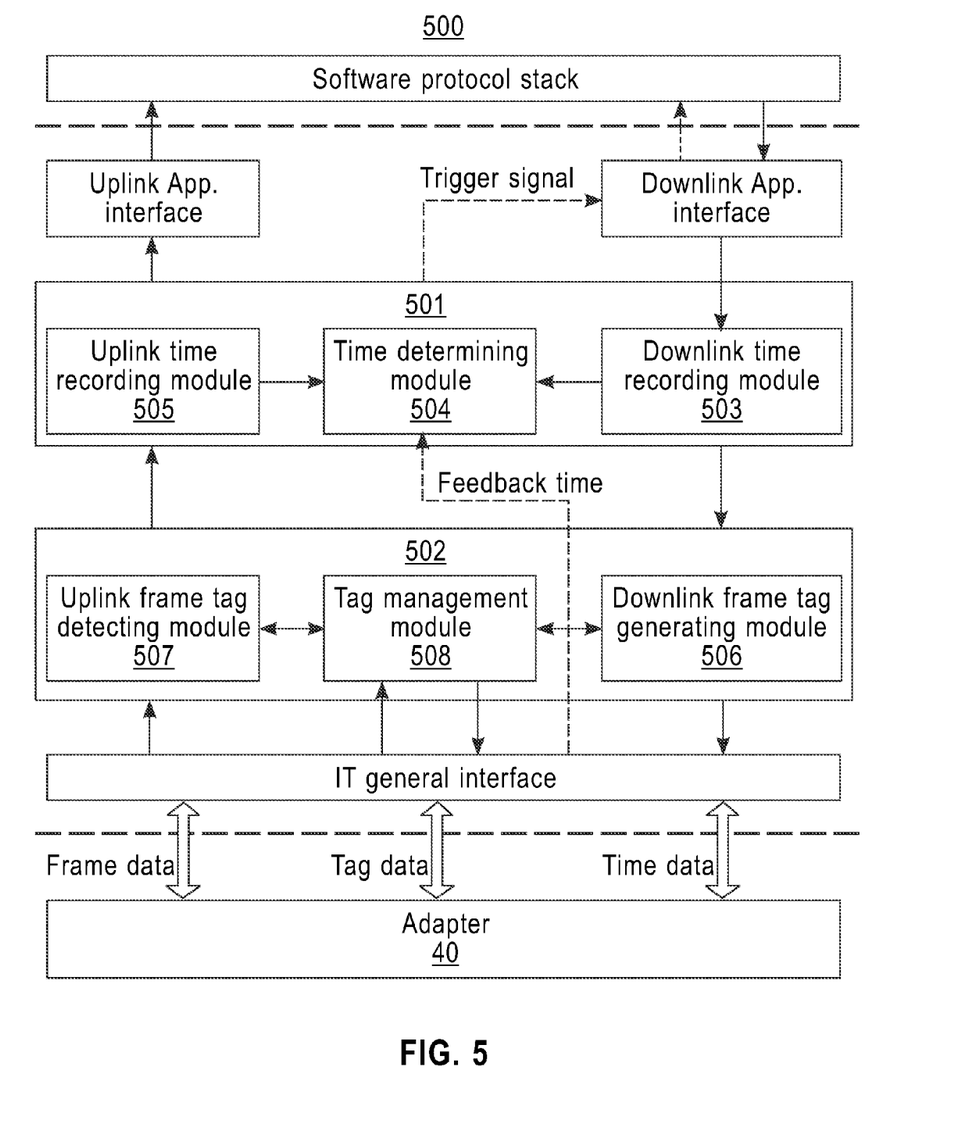
FIG. 5 shows a structure diagram of a base band processing unit according to a further embodiment of the present invention.

FIG. 5 shows a structure diagram of a base band processing unit according to an embodiment of the present invention. The base band processing unit 50 in FIG. 5 is coupled to the adapter of FIG. 4 via a general IT interface and exchanges frame data, tag data and time data. Specifically, the synchronizing module 500 in the base band processing unit 50 includes a time synchronizing module 501 configured to determine generation time of a current downlink data frame at least based on arrival time of a previous downlink data frame that was a previous feed back from the adapter. A frame synchronizing module 502 configured to manage frame tag of a downlink data frame.

As discussed above, the time feedback logic unit 403 in the adapter transmits timing data via an IT interface to the base band processing unit 50 time data, including reference time and time that a downlink data frame arrives at the adapter. Since a downlink data frame is generated in the base band processing unit 50 and transmitted to the adapter 40, the base band processing unit 50 may utilize arrival time of a previous downlink data frame received from the adapter 40 to predict time that a subsequent downlink data frame arrives at the adapter 40, and determine and adjust transmit time of a subsequent downlink data frame based thereon, thereby realizing time synchronization.

Figure 6:
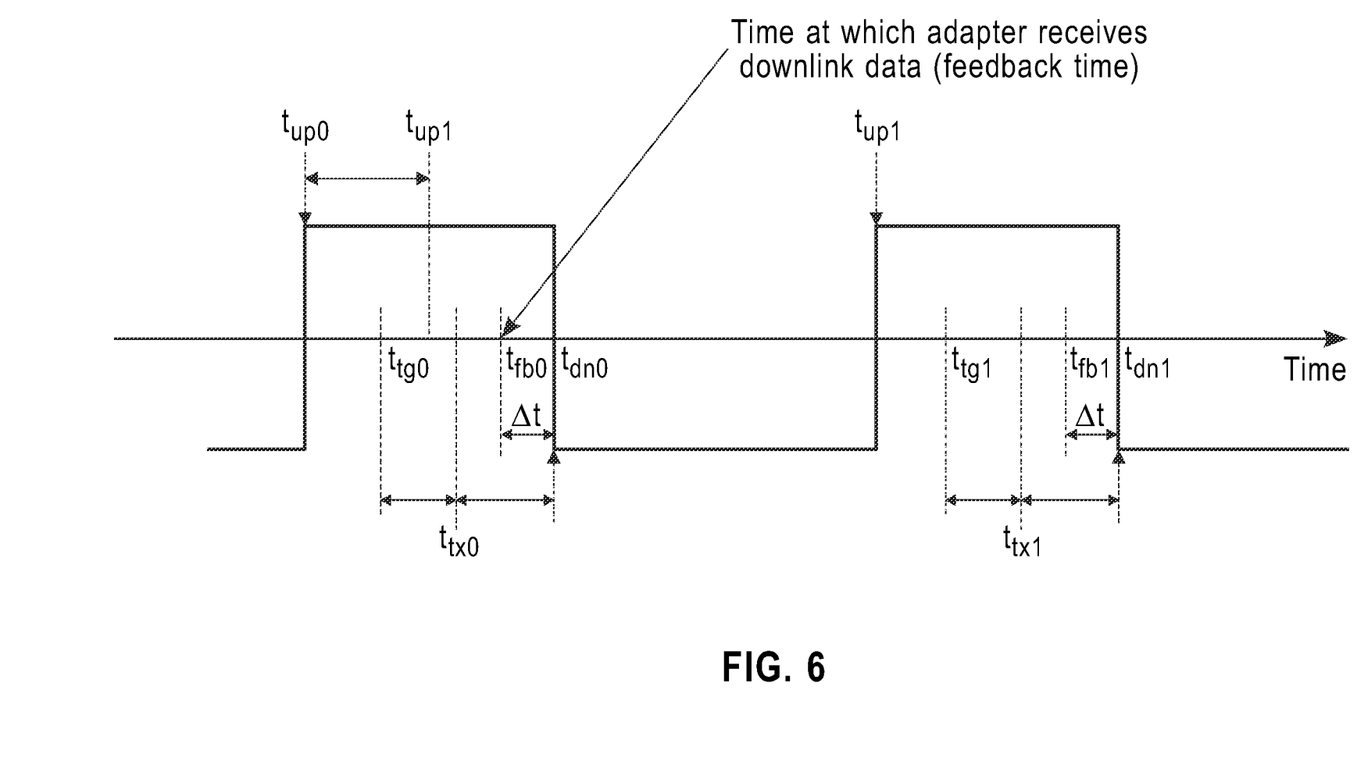
FIG. 6 shows an example of time sequence of uplink processing and downlink processing under TDD mode according to a further embodiment of the present invention.

FIG. 6 shows an example of time sequence of uplink processing and downlink processing under TDD mode. In FIG. 6, rising edge represents beginning of uplink time slot during which the RF unit receives signal from a mobile terminal and transmits the signal upstream to the base band processing unit for processing. Falling edge represents beginning of downlink time slot during which the RF unit transmits signal to a mobile terminal. For uplink data, assume at time $t_{up0}$ at which rising edge begins, the RF unit begins to receive uplink data, at subsequent time $t_{up1}$, the uplink data is transmitted from the RF unit to the base band processing unit 50 via the adapter 40 to start being processed. For downlink data, since the RF unit needs to transmit downlink data upon beginning of falling edge, the base band processing unit 50 must generate downlink data in advance. The process of generating and transmitting a previous downlink data frame (that is, frame 0) will be described first. Assume at time $t_{tg0}$, a downlink application in software protocol stack is triggered via a downlink application interface to generate downlink data of frame 0. Next, at time $t_{tx0}$, the downlink application generates downlink data and begins to transmit the downlink data to the adapter 40. Thereafter, at time $t_{fb0}$, the downlink data arrives at the adapter 40 via the IT interface. As stated above, time $t_{fb0}$ is just the downlink data arrival time that was the feed back from the adapter to the base band processing unit 50. To ensure that a downlink data frame arrives before the RF unit begins to transmit RF signal, time different $\Delta t_0 = t_{dn0} - t_{fb0}$ between arrival time $t_{fb0}$ of a downlink data frame and time $t_{dn0}$ at which the RF unit begins to transmit downlink data needs to be within a predetermined range. For example, within an interval $[\Delta t_{min}, \Delta t_{max}]$, in which $\Delta t_{min}$ and $\Delta t_{max}$ are predetermined values. Based on the previous feed back $t_{fb0}$ obtained from the adapter, trigger time $t_{tg1}$ of current downlink data frame (that is, frame 1) can be calculated and adjusted with various approaches, such that the current downlink data frame can arrive the adapter at proper time.

To determine time to generate current downlink data frame, in one embodiment, the time synchronizing module 501 includes a downlink time recording module 503 and a time determining module 504. The downlink time recording module 503 is configured to record generation time of a previous downlink data frame, and the time determining module 504 is configured to determine generation time of a subsequent current downlink data frame at least based on generation time of the previous downlink data frame and arrival time of the previous downlink data frame obtained via feedback. Referring to the example of FIG. 6, the downlink time recording module 503 can record generation time $t_{tg0}$ of a previous downlink data frame (that is, frame 0). The time determining module 504 determines generation time $t_{tg1}$ of current downlink data frame (frame 1) at least based on $t_{tg0}$ and the previous feed back $t_{fb0}$. In embodiments of the present invention, the time determining module 504 can utilize various approaches to determine time $t_{tg1}$. For example, to make the above time difference $\Delta t_0$ satisfy $\Delta t_{min} \leq \Delta t_0 \leq \Delta t_{max}$, $t_{fb0}$ should satisfy:

$$t_{dn0} - \Delta t_{max} \leq t_{fb0} \leq t_{dn0} - \Delta t_{min}$$

where $\Delta t_{min}$ and $\Delta t_{max}$ are predetermined values, and $t_{dn0}$ can be determined based on reference time. In one example, the time determining module 504 first judges whether $t_{fb0}$ obtained via feedback is within the above predetermined range. If $t_{fb0}$ is within the above range, then current downlink data frame is still generated according to original cycle. If $t_{fb0}$ exceeds the above range, then generation time of current downlink data frame needs to be re-calculated. In one example, if feedback time $t_{fb0}$ makes $\Delta t_0 > \Delta t_{max}$, then the time determining module 504 sets trigger time of downlink data of frame 1 as: $t_{tg1} = t_{dn1} - \Delta t_{max} - (t_{fb0} - t_{tg0})$. If feedback time $t_{fb0}$ makes $\Delta t_0 < \Delta t_{min}$, then trigger time of downlink data of frame 1 is set as: $t_{tg1} = t_{dn1} - \Delta t_{min} - (t_{fb0} - t_{tg0})$.

In another embodiment, the time synchronizing module 501 further includes an uplink time recording module 505 configured to record time at which an uplink data frame arrives at the base band processing unit 50. In this example, the time determining module 504 determines generation time of a downlink data frame by further referring to uplink data arrival time recorded by the module 505.

Specific examples of determining when to generate a subsequent downlink data frame by using the previous feed back downlink data frame arrival time has been described. It is appreciated that, however, the time synchronizing module 501 can employ more approaches to dynamically adjust generation time of a subsequent downlink data frame based on the previous feed back time, such that a downlink data frame generated by the base band processing unit 50 arrives at the adapter 40 at proper time, that is, time synchronization between the base band processing unit 50 and the adapter 40 is realized.

According to an embodiment of the present invention, the time determining module 504 issues a trigger signal to a downlink application via a downlink application interface at the determined downlink data frame generation time (e.g., $t_{tg1}$), to make the downlink application generate a downlink data frame.

The generated downlink data frame then passes through the frame synchronizing module 502 to perform synchronization processing on the data frame. The frame synchronizing module 502 operates in conjunction with the frame synchronizing logic unit 402 in the adapter and realizes frame synchronization by managing a frame tag of the data frame. The frame synchronizing module 502 includes a downlink frame tag generating module 506, an uplink frame tag detecting module 507 and a tag management module 508. The downlink frame tag generating module 506 is configured to generate a frame tag for a downlink data frame. The uplink frame tag detecting module 507 is configured to, for an uplink data frame that is from the adapter 40 and has added with a frame tag, detect the added frame tag. The tag management module 508 is configured to guarantee correspondence between frame tag of the uplink data frame and that of the downlink data frame. In one embodiment, the downlink frame tag generating module 506 generates a frame tag for a downlink data frame based on a predetermined tag generation rule. The above tag generation rule can be designated and managed by the tag management module 508. In one embodiment, if a case that the frame tag of the uplink data frame does not correspond to that of the downlink data frame is detected, then the tag management module 508 can adjust sequence of the downlink data frame or change frame tag of the downlink data frame, to ensure that the adjusted or changed frame tag of the downlink data frame corresponds to that of the uplink data frame.

As described above, the time synchronizing module 501 in the synchronizing module 500 can cause the base band processing unit 50 generate a downlink data frame at proper time, while the frame synchronizing module 502 can manage frame tag of a downlink data frame. Frame synchronization between an uplink data frame and a downlink data frame and time synchronization between the adapter 40 and the base band processing unit 50 can be guaranteed in case that the synchronizing module 500 operates in conjunction with the synchronization processing logic 400 in the adapter 40. All of the above implementation manners of the adapter and base band processing unit are applicable to TDD communication mode.

The adapter 40 shown in FIG. 4 and the base band processing unit 50 shown in FIG. 5 can be further modified so as to be applicable to both TDD and FDD communication mode.

Figure 7:
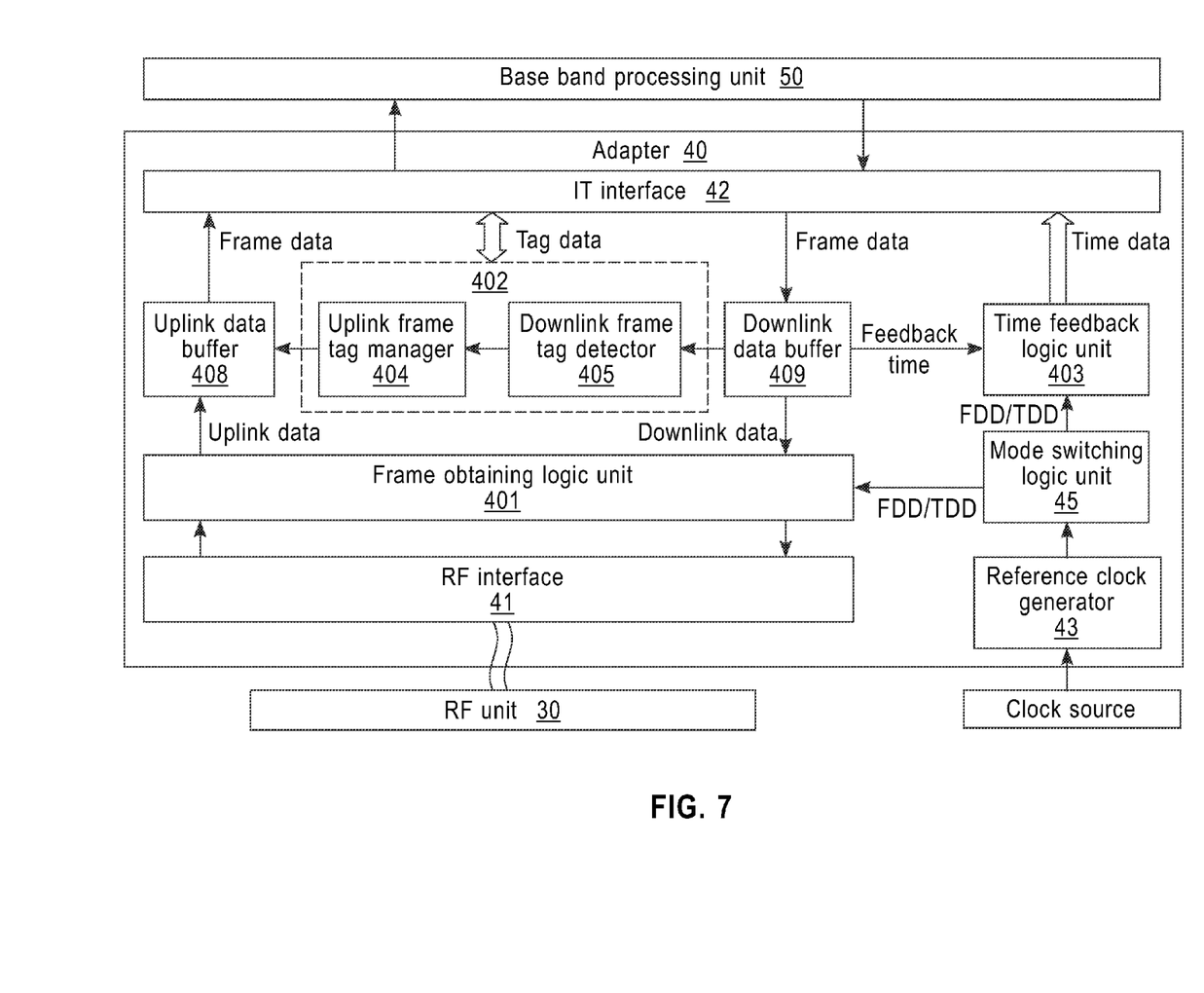
FIG. 7 shows a structure diagram of a dual mode adapter according to a further embodiment of the present invention.

FIG. 7 shows a structure diagram of a dual mode adapter according to an embodiment of the present invention. Compared to the adapter 40 shown in FIG. 4, the adapter 40 of FIG. 7 further includes a mode switching logic 45 which causes the adapter to perform mode switching between TDD mode and FDD mode by issuing a mode notification signal. In one embodiment, the mode switching logic 45 is configured to automatically detect current communication mode. Usually, RF units of different types, models and configuration are applicable to different communication modes. Therefore, in one embodiment, the mode switching logic 45 determines current communication mode by detecting model of the connected RF unit. In another embodiment, the mode switching logic 45 can accept mode setting and determine current communication mode. Based on the determined communication mode, the mode switching logic 45 can issue a mode notification signal to other logics in the adapter 40, so as to notify other logics to operate under certain mode. Accordingly, respective logic units in the adapter 40 are configured to switch to certain operating mode in response to the mode notification signal.

According to one embodiment of the present invention, the mode switching logic 45 transmits a mode notification signal to the frame obtaining logic unit 401. Accordingly, the frame obtaining logic unit 401 is further configured to perform de-framing and framing under different modes according to the mode notification signal. Under TDD mode, the frame obtaining logic unit 401 performs time slot switching on a radio frame so as to obtain an uplink data frame. In addition, the frame obtaining logic unit 401 can also obtain a downlink data frame from upstream and form an uplink data frame and a downlink data frame into a radio frame according to time slot arrangement. As described above with reference to FIG. 4. While under FDD mode, radio frames have different features and structures. As is known to a person skilled in the art, under FDD mode, uplink data and downlink data are transmitted over two symmetrical frequency channels, and therefore, one radio frame only contains uplink data or downlink data. In response to a FDD mode notification signal, the frame obtaining logic unit 401 switches to FDD operating mode under which the frame obtaining logic unit 401 directly obtains data from an uplink radio frame as uplink data frame (without performing time slot switching). Similarly, for a downlink data frame obtained from upstream, the frame obtaining logic unit 401 can directly form them into a downlink radio frame.

Additionally, the mode switching logic 45 transmits a mode notification signal to the time feedback logic unit 403. The time feedback logic unit 403 is arranged to solve time synchronization problem between the adapter 40 and the base band processing unit 50 under TDD mode. While under FDD mode, such time synchronization is not required. Therefore, in response to a TDD mode notification signal, the time feedback logic unit 403 provides feedback of downlink data arrival time to assist in time synchronization processing, as described with reference to FIG. 4. In response to a FDD mode notification signal, the time feedback logic unit 403 enters into idle state in which the time feedback logic unit 403 does nothing.

In addition, those skilled in the art can appreciate that, frame synchronization processing is required in both TDD mode and FDD mode. There is no change in implementation manner of the frame synchronization logic unit 402 and it will not be described here for brevity.

Figure 8:
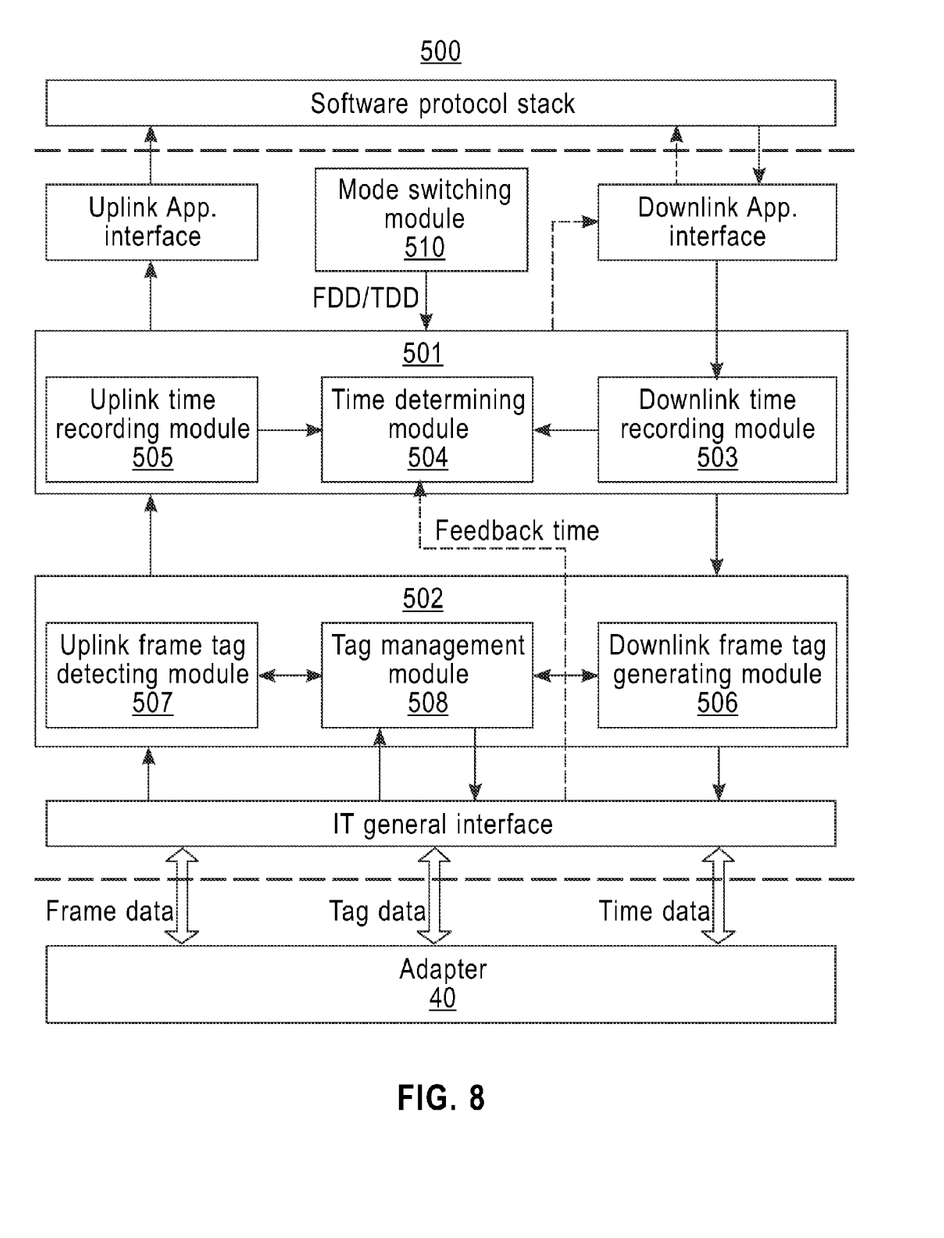
FIG. 8 shows a structure diagram of a base band processing unit according to a further embodiment of the present invention.

Corresponding to the adapter of FIG. 7, the base band processing unit 50 can be extended to be applicable to dual mode communication. FIG. 8 shows a structure diagram of a base band processing unit according to an embodiment of the present invention. Compared to the base band processing unit shown in FIG. 5, the base band processing unit 50 of FIG. 8 further includes a mode switching module 510 for determining communication mode, issuing a mode notification signal, and enabling the base band processing unit to perform mode switching between TDD mode and FDD mode.

In one embodiment, the mode switching module 510 can be used as an interface for accepting user's setting on communication mode and determine communication mode based on that setting. Further, the mode switching module 510 can notify the mode switching logic 45 in the adapter 40 of the determined communication mode, to make the mode switching logic 45 learn current communication mode. Based on the determined communication mode, the mode switching module 510 may issue a mode notification signal to other modules in the base band processing unit 50, to notify other modules to operate under certain mode. The time synchronizing module 501 in the base band processing unit 50 is arranged to solve time synchronization problem under TDD mode, while under FDD mode, such time synchronization is not required. Therefore, in response to a TDD mode notification signal, the time synchronizing module 501 controls transmission time of downlink data based on the feedback timing information, as described with reference to FIG. 5. In response to a FDD mode notification signal, the time synchronizing module 501 enters into idle state and does nothing. As mentioned before, frame synchronization processing is required in both TDD mode and FDD mode. There is no change in execution manner of the frame synchronizing module 502 and it will not be described here for brevity.

Therefore, by adding a mode switching logic/module in the adapter 40 and the base band processing unit 50 respectively, and making the time feedback logic unit 403 and time synchronizing module 501 do not operate under FDD mode, the adapter 40 and the base band processing unit 50 can be made to be applicable to both TDD and FDD communication modes.

Each of the logics in the described adapter 40 can be implemented via a programmable hardware such as FPGA, DSP. Alternatively, in one embodiment, logics in the adapter 40 can be implemented by software or by combination of software and hardware. Since the base band processing unit 50 is based on a general IT platform, each module is mainly embodied as software module. It is appreciated that, under teaching of the present specification, a person skilled in the art can make various modifications to the form of the adapter 40 and the base band processing unit 50 described in the above embodiments, such as by combining some logics or modules or dividing some logics or modules. All such modifications are to be encompassed within the concept of the invention.

The embodiments of the present invention, a base station system over a general IT platform is capable of achieving time synchronization between an adapter and a base band processing unit to be better operated in TDD mode. The base station system is also made to be capable of switching between TDD mode and FDD mode to be applicable to a dual mode radio access network.

Figure 9:
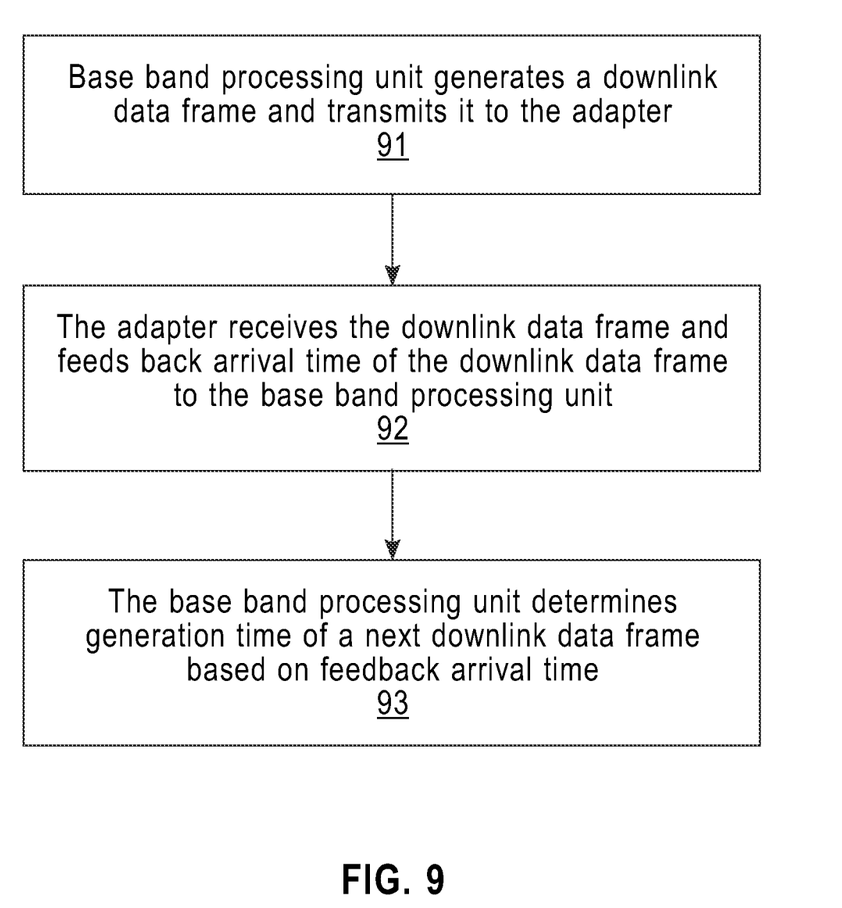
FIG. 9 shows a flowchart of a method according to a further embodiment of the present invention.

Embodiments of the present invention also provide a method of performing time synchronization for TDD communication mode between an adapter and a base band processing unit in a base station system. FIG. 9 shows a flowchart of a method according to an embodiment of the invention. As shown in FIG. 9, at step 91, a base band processing unit generates a downlink data frame and transmits the downlink data frame to the adapter. At step 92, the adapter receives the downlink data frame and feeds back arrival time of the downlink data frame to the base band processing unit. At step 93, the base band processing unit determines generation time of a next downlink data frame at least based on the previous feed back arrival time of the downlink data frame.

In one embodiment of the present invention, at step 93, the base band processing unit first judges whether arrival time of the downlink data frame obtained via feedback is within a predetermined range. If the feed back time is within the above range, the base band processing unit still generates the next downlink data frame according to original cycle. If the feed back time exceeds the above range, then the base band processing unit recalculates generation time of the next downlink data frame at least based on the feed back time.

For description of the implementation manner of the method shown in FIG. 9, reference can be made to the description in reference to the time feedback logic unit of FIG. 4, the time determining module of FIG. 5 and the time sequence diagram of FIG. 6.

The flowchart and block diagrams in the Figures illustrate the architecture, functionality, and operation of possible implementations of systems, methods and computer program products according to various embodiments of the present invention. In this regard, each block in the flowchart or block diagrams can represent a module, segment, or portion of code, which includes one or more executable instructions for implementing the specified logical function(s). It should also be noted that, in some alternative implementations, the functions noted in the block may occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed.

What is claimed is:

1. An adapter for connecting between a Radio Frequency RF unit and a base band processing unit in a base station system, the adapter comprising:
    a frame obtaining logic unit configured to obtain an uplink data frame based on a received radio frame;
    a frame synchronizing logic unit configured to manage a frame tag of the uplink data frame, wherein the frame synchronizing logic unit comprises: a downlink frame tag detector configured to detect a frame tag of a received downlink data frame; and an uplink frame tag manager coupled to the downlink frame tag detector and configured to add a corresponding frame tag to an uplink data frame based on the detected frame tag of the downlink data frame; and
    a time feedback logic unit configured to feed back to the base band processing unit an arrival time of a downlink data frame that is received from the base band processing unit.

2. The adapter of claim 1, wherein the frame obtaining logic unit is configured to perform time slot switching on the radio frame to obtain the uplink data frame.

3. The adapter of claim 1, wherein the frame obtaining logic unit is further configured to obtain the downlink data frame from upstream and form a radio frame to be transmitted based on the uplink data frame and the downlink data frame.

4. The adapter of claim 1, wherein the frame tag of the downlink data frame is generated according to a predetermined rule and wherein the uplink frame tag manager is configured to add a corresponding frame tag to an uplink data frame based on the detected frame tag of the first downlink data frame, and add a frame tag to a subsequent uplink data frame based on the predetermined rule.

5. The adapter of claim 1, wherein the uplink frame tag manager is configured to periodically check correspondence between the frame tag of the uplink data frame and the frame tag of the downlink data frame.

6. The adapter of claim 1, wherein the time feedback logic unit comprises:

a time providing logic configured to provide a reference time based on a reference clock; and
a time recording logic configured to record an arrival time of the downlink data frame based on the reference time and transmit the recorded time to the base band processing unit.

7. An adapter for connecting between a Radio Frequency RF unit and a base band processing unit in a base station system, the adapter comprising:
a frame obtaining logic unit configured to obtain an uplink data frame based on a received radio frame;
a frame synchronizing logic unit configured to manage a frame tag of the uplink data frame;
a time feedback logic unit configured to feed back to the base band processing unit an arrival time of a downlink data frame that is received from the base band processing unit: and
a mode switching logic configured to determine a communication mode and issue a mode notification signal:
wherein the mode notification signal is a Frequency Division Duplex (FDD) mode notification signal;
wherein the frame obtaining logic unit is configured to directly obtain an uplink data frame from an uplink radio frame in response to the FDD mode notification signal; and
wherein the time feedback logic unit is configured to enter into an idle state in response to the FDD mode notification signal.

8. A base band processing unit over a general Information Technology (IT) platform that is coupled to an adapter, the base band processing unit comprising:
a time synchronizing module configured to determine a generation time of a current downlink data frame based on at least an arrival time of a previous downlink data frame that was a previous feed back from the adapter;
a frame synchronizing module configured to manage a frame tag of the current downlink data frame; and
a mode switching module configured to determine a communication mode and issue a mode notification signal:
wherein the mode notification signal is a Frequency Division Duplex (FDD) mode notification signal and the time synchronizing module is configured to enter into an idle state in response to the FDD mode notification signal.

9. The base band processing unit of claim 8, wherein the frame synchronizing module comprises:
a downlink frame tag generating module configured to generate a frame tag for a downlink data frame;
an uplink frame tag detecting module configured to detect a frame tag of a received uplink data frame; and
a tag management module configured to guarantee correspondence between the frame tag of the uplink data frame and the frame tag of the downlink data frame.

10. The base band processing unit of claim 9, wherein the tag management module is configured to designate a generation rule of the frame tag and wherein the downlink frame tag generating module is configured to generate a frame tag for a downlink data frame based on the generation rule.

11. The base band processing unit of claim 8, wherein the mode switching module is configured to notify the adapter of the determined communication mode.

12. A method for performing time synchronization in Time Division Duplex (TDD) communication mode between an adapter and a base band processing unit in a base station system:
wherein the adapter includes a reference clock generator and a synchronizing logic unit; and
wherein the synchronizing logic unit includes: a downlink frame tag detector configured to detect a frame tag of a received downlink data frame; and a time feedback logic unit coupled to the reference clock generator, the method comprising:
generating, by the base band processing unit, a downlink data frame;
transmitting, by the base band processing unit, the downlink data frame to the adapter;
receiving, by the adapter, the downlink data frame;
detecting, by the downlink frame tag detector, a frame tag of the received downlink data frame;
providing, by the reference clock generator, a reference time;
recording, by the time feedback logic unit, an arrival time of the downlink data frame based on the reference time;
feeding back, by the time feedback logic unit, the arrival time and reference time of the downlink data frame to the base band processing unit; and
determining, by the base band processing unit, a generation time of a next downlink data frame based on at least the feed back arrival time of the downlink data frame.

13. A computer readable non-transitory article of manufacture tangibly embodying computer readable instructions which, when executed, cause a computer to carry out the steps of a method according to claim 12.

14. The method according to claim 12:
wherein determining the generation time of the next downlink data frame further comprises:
utilizing, by the base band processing unit, the arrival time of a previous downlink data frame to predict a subsequent time that a subsequent downlink data frame arrives at the adapter; and
adjusting, by the base band processing unit, a transit time of the subsequent downlink data frame based on the subsequent time predicted.

15. The method according to claim 14, wherein the base band processing unit includes a synchronization module.

16. A base band processing unit over a general Information Technology (IT) platform that is coupled to an adapter, the base band processing unit comprising:
a time synchronizing module configured to determine a generation time of a current downlink data frame based on at least an arrival time of a previous downlink data frame that was a previous feed back from the adapter; and
a frame synchronizing module configured to manage a frame tag of the current downlink data frame:
wherein the time synchronizing module comprises: a downlink time recording module configured to record a generation time of the previous downlink data frame; and a time determining module; and
wherein the time determining module is configured to:
determine the generation time of the current downlink data frame based on at least the generation time of the previous downlink data frame and the arrival time of the previous downlink data frame that was feedback from the adapter;
determine whether the arrival time of the previous downlink data frame obtained via feedback is within a predetermined range;
in response to the determination that the arrival time is within the predetermined range, the time determining module determines the generation time of the current downlink data frame according to an original cycle; and
in response to the determination that the arrival time exceeds the predetermined range, the time determining module recalculates the generation time of the current downlink data frame based on at least the generation time of the previous downlink data frame and the arrival time of the previous downlink data frame.

17. A base band processing unit over a general Information Technology (IT) platform that is coupled to an adapter, the base band processing unit comprising:
- a time synchronizing module configured to determine a generation time of a current downlink data frame based on at least an arrival time of a previous downlink data frame that was a previous feed back from the adapter; and
- a frame synchronizing module configured to manage a frame tag of the current downlink data frame, wherein the time synchronizing module comprises:
- a downlink time recording module configured to record a generation time of the previous downlink data frame; and
- a time determining module configured to: determine the generation time of the current downlink data frame based on at least the generation time of the previous downlink data frame and the arrival time of the previous downlink data frame that was feedback from the adapter; and issue a trigger signal to a downlink application at the determined generation time of the current downlink data frame, so that the downlink application generates the current downlink data frame.

18. The base band processing unit of claim 7, wherein the mode switching module is configured to notify the adapter of the determined communication mode.

* * * * *